United States Patent [19]

Kraus

[11] 4,028,588
[45] June 7, 1977

[54] ARRANGEMENT FOR VARYING THE EXCITATION OF A DEFLECTION CIRCUIT IN RESPONSE TO LOAD CHANGES AND THE LIKE

[75] Inventor: Heinz Kraus, Burggrub, Germany
[73] Assignee: Loewe-Opta GmbH., Kronach, Germany
[22] Filed: Dec. 17, 1975
[21] Appl. No.: 641,644
[30] Foreign Application Priority Data
Dec. 19, 1974 Germany .......................... 2460014
[52] U.S. Cl. .............................. 315/387; 315/399
[51] Int. Cl.$^2$ .................... H01J 29/70; H01J 29/76
[58] Field of Search .................. 315/387, 389, 399
[56] References Cited
UNITED STATES PATENTS
3,609,219  9/1971  Diehl ................................. 315/387
3,789,260  1/1974  Ahrens ............................... 315/387

Primary Examiner—Maynard R. Wilbur
Assistant Examiner—T. M. Blum

[57] ABSTRACT

An arrangement for varying the triggering phase of a thyristor or other controllable switch employed to vary the excitation of a sweep deflection circuit during changes in the circuit load is described. The output of a winding of the deflection transformer is converted to a constant-amplitude sawtooth voltage which has a DC component proportional to the amplitude of the then-occurring forward sweep portion of the sweep voltage. A zener diode or other comparison element coupled to the output of a variable voltage divider whose input is fed by the resulting sawtooth voltage generates a trigger pulse for the controllable switch at the instant, during each cycle of the sweep waveform, that the constant-amplitude sawtooth voltage exceeds a predetermined value.

5 Claims, 5 Drawing Figures

ARRANGEMENT FOR VARYING THE EXCITATION OF A DEFLECTION CIRCUIT IN RESPONSE TO LOAD CHANGES AND THE LIKE

BACKGROUND OF THE INVENTION

The invention concerns an arrangement for automatically varying the excitation of a sweep deflection circuit (illustratively a horizontal deflection circuit for a television receiver), and more particularly to arrangements of this type employing a thyristor or other controllable switch which is associated with the deflection circuit and which is responsive to a variable-phase trigger control pulse applied to a control electrode of the switch during each cycle of the sweep waveform for varying the excitation of the deflection circuit in proportion to load-induced changes in the phase of the control pulse.

Sweep deflection circuits of known type employ a line transformer whose output voltage exhibits a repetitive waveform including a forward sweep portion and a flyback portion. The voltage generated by the transformer is fed to suitable deflection coils in a cathode ray tube or the like. Ordinarily, changes in the excitation or load conditions of the cathode ray tube lead to corresponding changes in the output voltage of the transformer.

In order to compensate for such changes in load, circuitry has been developed for varying the excitation of the deflection circuit, and thereby the voltage of the transformer, in response to changes in the operating condition of the cathode ray tube fed by the transformer. Typically, such arrangements couple, to the excitation inputs of the deflection circuit, the transconductive path of a thyristor or other thyratron-like controllable switch. The control electrode of such switch is generally coupled to a source of phase-variable trigger pulses, which in turn are derived at least in part from the flyback portion of the voltage appearing on the deflection transformer. Such trigger pulse is varied in phase in proportion to changes in the operating load conditions on the transformer from a nominal value, thereby varying the conductive interval of the switch and thus its energy interchange with the deflection circuit to ideally compensate for such load changes.

One disadvantage of known compensation circuits of this type employing controllable switches is that, in general, they require the derivation of two separate control signals (at least one of which is responsive to the flyback portion of the sweep voltage), and the subsequent comparison of such independent signals to determine the phase of the switch trigger signal. Such necessity of initially generating the two separate signals to be compared (either from separate portions of the deflection circuit or from separate portions of the sweep waveform) makes the resultant compensation circuit complicated and expensive.

SUMMARY OF THE INVENTION

The arrangement of the present invention provides a thyristor-type technique for varying the excitation of a sweep deflection circuit in response to load-induced changes in operation, while avoiding the above disadvantages. In particular, the control quantity from which the variable-phase switch trigger pulse is derived is generated with the use of only a single input signal. Additionally, the invention takes advantage of the fact that the ratio of the forward sweep portion to the flyback portion of each sweep waveform cycle is constant irrespective of load changes, and employs such principle to directly employ the variations in the forward sweep voltage, instead of the flyback voltage, to determine the phase of the switch trigger voltage.

In an illustrative embodiment, the voltage on a winding of the deflection transformer is converted into a constant-amplitude sawtooth voltage having a variable DC component which is instantaneously proportional to the amplitude of the then-occurring forward sweep portion of the waveform. Such sawtooth voltage is applied to the input of a variable voltage divider, whose output is coupled to a zener diode which yields a control pulse at the instant during each cycle of the sweep waveform that such sawtooth voltage exceeds a predetermined amplitude indicative of an established breakdown point of the zener diode. The control pulse at the output of the zener diode terminates at the instant when the sawtooth voltage decays below the zener reference voltage during the subsequent flyback portion of the sweep waveform. Advantageously, the output of the zener diode is coupled, illustratively through at least one transistor, to a differentiating circuit to increase the steepness of the leading edge of the pulse to assure extremely reliable triggering of the thyristor switch.

The invention is further set forth in the following detailed description taken in conjunction with the appended drawing, in which:

FIG. 2b illustrates a set of comparative curves illustrating the relationship among several waveforms in the circuit of FIG. 1 during the three operating conditions indicated above in connection with FIG. 2a;

DETAILED DESCRIPTION

Figure 1:
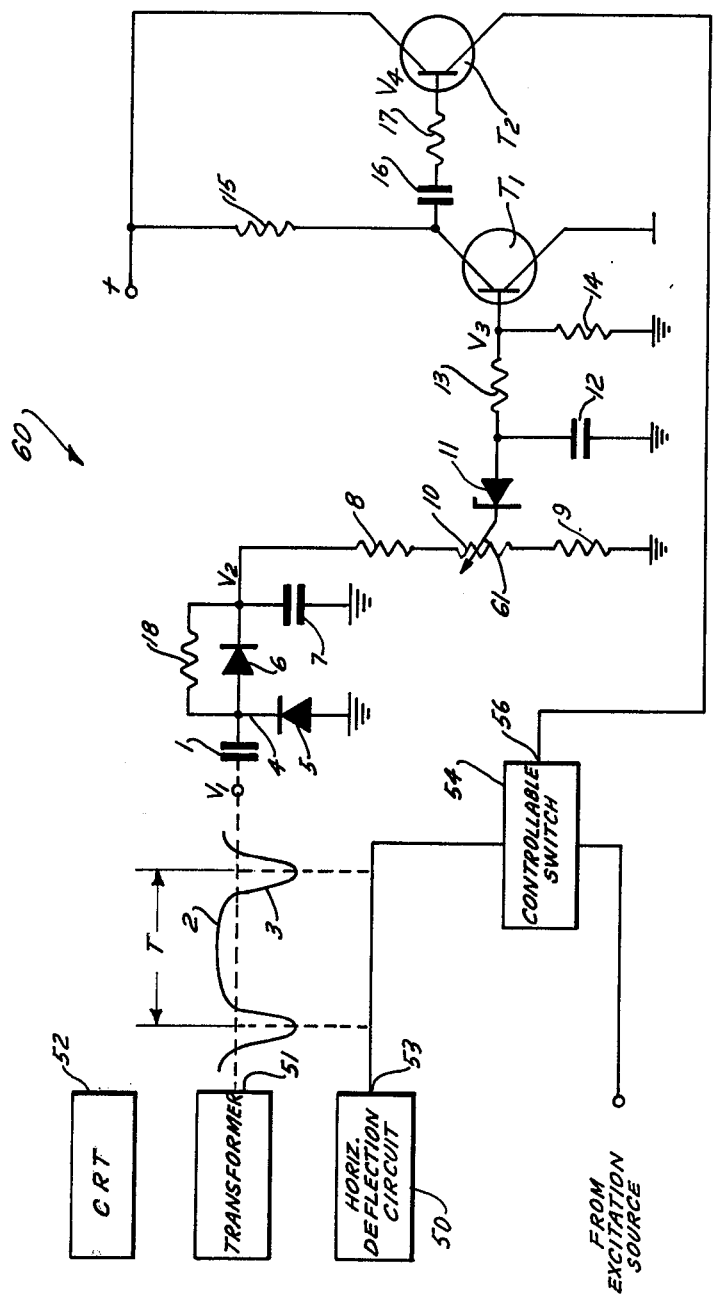
FIG. 1 is a combined block and schematic diagram of an arrangement constructed in accordance with the invention for automatically regulating the excitation of a sweep deflection circuit.

Referring to FIG. 1, there is illustrated an arrangement suitable for use in a television receiver for varying the excitation of a conventional horizontal deflection circuit 50 which is associated with a conventional deflection transformer 51. The output of the transformer 51 is coupled to suitable deflection coils (not shown) of a cathode ray tube 52. As is well-known, variations in the operating conditions of the tube 52, illustratively in its beam circuit, effect corresponding variations in the loading of the transformer 51; in particular, an increase in the beam current drawn by the tube 52 will result in a diminution of the voltage supplied by the transformer 51, and vice-versa.

The voltage waveform at the output of the transformer 51 is a repetitive signal having a period T, such waveform including a forward sweep portion 2 and a flyback portion 3. As is well-known, the ratio of the forward sweep amplitude to the flyback amplitude is constant, so that a drop in the flyback pulse amplitude caused, e.g., by an increase in beam current drawn by the tube 52 will be accompanied by a corresponding drop in the amplitude of the forward sweep portion. As is also well-known, the duration of the forward sweep portion 2 and the duration of the flyback portion 3 will remain constant irrespective of changes in the amplitude of the corresponding portions.

In order to compensate the above-mentioned variations in the operating conditions of the tube 52 and thereby the variations in voltage on the transformer 51, the deflection circuit 50 has associated with its excitation input 53 the transconductive path of a controllable switch 54, illustratively a thyristor. Such transconductive path is coupled to a suitable source of excitation during the forward sweep portion of the deflection waveform; however, the actual period of excitation of such thyristor 54, and thereby the degree of control that such thyristor exerts on the excitation of the circuit 50, is dependent on the time during such forward sweep interval that a control electrode 56 of the thyristor 54 is excited. Once such excitation is accomplished, the thyristor 54 will remain conductive for the remaining portion of the associated forward sweep interval. The conduction time of the thyristor 54 will determine the degree of loading of such thyristor on the input of the deflection circuit 53, and thereby on the voltage exhibited at the transformer 51. In particular, an increase in the conduction time of the thyristor (i.e., a decrease in the interval between the start of the forward sweep waveform and the instant of excitation of the thyristor control electrode) will lead to a decrease in the voltage on the transformer 51, and vice-versa.

The excitation instant of the thyristor 54, and thereby the phase shift between the start of the forward sweep interval and the triggering of the thyristor is controlled in accordance with the invention with a circuit arrangement designated generally at 60.

Figure 2A:
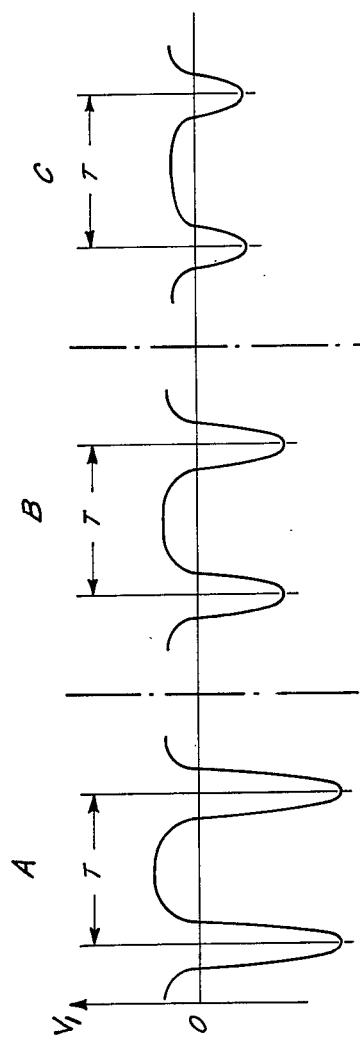
FIG. 2a is a series of curves respectively indicating typical voltage waveforms at the output of the deflection transformer of FIG. 1 at three separate operating conditions of the transformer load.

The circuit 60 has an input capacitor 1 which is coupled to the voltage at a prescribed winding (not shown) of the transformer 51; such input voltage, which is designated as $V_1$ in FIGS. 1 and 2a, has the forward sweep portion 2 and the flyback portion 3 described above. The output of the capacitor 1 is coupled through a charging diode 6 to a second capacitor 7, the diode 6 being poled to present a low impedance to the forward sweep portion 2 of the waveform $V_1$. During each forward sweep, the voltage across the capacitor 7 (designated $V_2$ in FIGS. 1 and 2b) increases linearly as shown to a value proportional to the then-occurring amplitude of the sweep portion 2 of the waveform $V_1$.

A second diode 5, which is poled opposite to the diode 6, is connected in series with a discharge resistor 18 across the capacitor 7. The junction of the diode 5 and the resistor 18 is connected to the junction of the capacitor 1 and the diode 6 as shown. With this arrangement, at the start of the flyback interval 3 the diode 6 becomes non-conductive and the diode 5 becomes conductive, whereby the peak value of the voltage $V_2$ reached by the capacitor 7 at the end of the forward sweep interval 2 decreases essentially linearly as such capacitor discharges through the path established by the resistor 18 and the now-conductive diode 5 over the fixed interval of the flyback portion 3. Since both the time constant of the discharge path and the flyback interval are fixed, the change in voltage across the capacitor 7 during the flyback interval from its maximum value $V_B$ to its minimum value $V_A$ will always be constant, and the sawtooth waveform will be of constant amplitude.

Additionally, the value $V_A$ (which for purposes of the instant invention is the effective DC value of the waveform, as indicated below) will, like the peak value $V_B$, be proportional to the amplitude of the immediately preceeding forward steep portion 2.

Figure 2B:
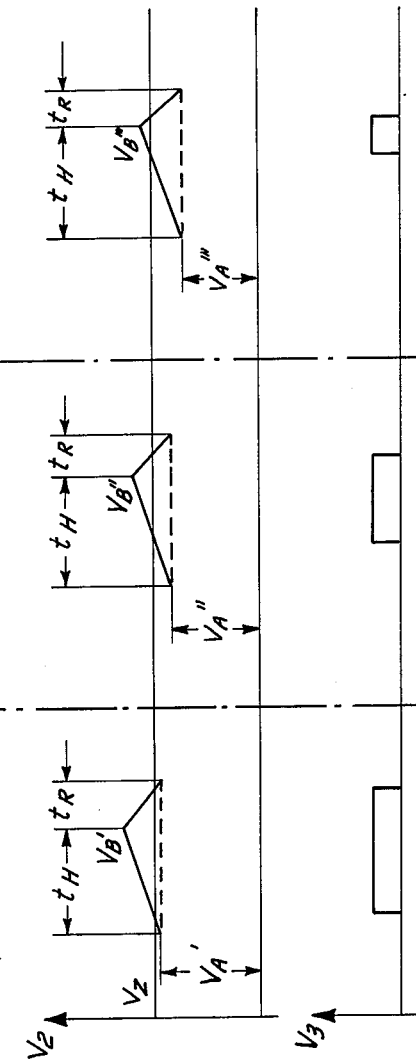

The manner in which the constant-amplitude sawtooth voltage shown in FIG. 2b, having a variable DC value instantaneously proportional to the amplitude of the then-occurring forward sweep portion of the transformer voltage, is employable to determine the triggering instant of the switch 54 will now be described. A variable voltage divider consisting of a pair of fixed resistances 8 and 9 and a variable resistance 10 is connected across the capacitor 7 exhibiting the voltage $V_2$. A zener diode 11 is coupled across the output terminals of the divider 8, 9, 10, such output being taken between a tap point 61 of the resistor 10 and ground as viewed in FIG. 1. The output of the zener diode 11, which is bypassed to ground for high-frequency spurious signals by means of a filter capacitor 12, is coupled via a fixed voltage divider consisting of resistances 13, 14 to the base of a first transistor $T_1$. The zener diode 11 acts as a threshold-type comparison element, whereby a pulse is initiated at its output when the voltage applied thereto exceeds a predetermined amplitude which is adjustable, e.g., by means of the tap point 61. With particular reference to FIGS. 1 and 2b, the predetermined amplitude set on the zener diode 11 is indicated as $V_Z$, and is adjusted to fall between the maximum and minimum voltage values $V_B$ and $V_A$, respectively, of the sawtooth voltage $V_2$. Once adjusted, the amplitude $V_Z$ will remain essentially constant irrespective of changes in the sweep waveform from the transformer 51, as is evident from a comparison of columns A, B and C of FIG. 2b.

Figure 2C:
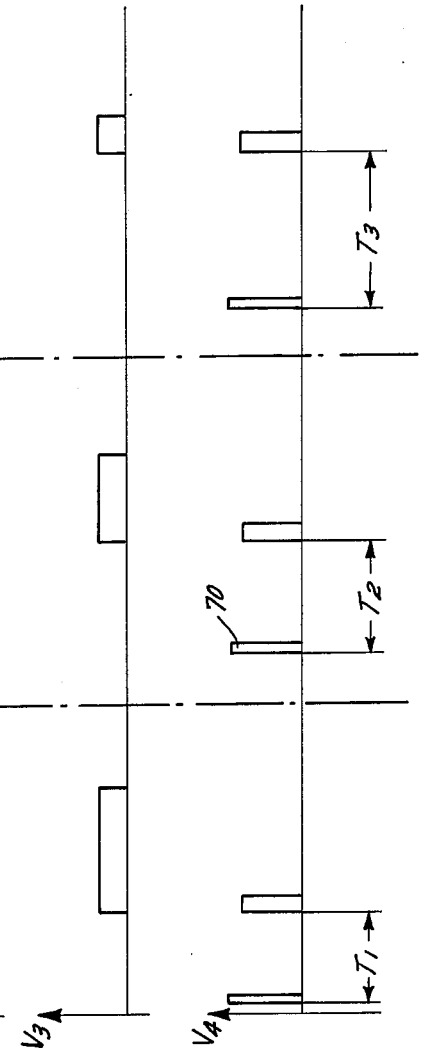
FIG. 2c is a set of curves illustrating a phase-variable trigger pulse waveform generated by the circuit of FIG. 1 under the same three operating conditions.

The output of the zener diode 11, which corresponds to the voltage $V_3$ at the base of the transistor $T_1$, is depicted in FIG. 2c. It will be noted, from a comparison of FIGS. 2b and 2c, that the leading edge of the pulse $V_3$ occurs when the positive-slope portion of the sawtooth voltage $V_2$ across the capacitor 7 exceeds the reference value $V_Z$ of the zener diode during the occurrence of the forward sweep portion 2 of the waveform $V_1$. The conduction period of the diode 11, and thereby the duration of the pulse $V_3$, will continue until the voltage $V_2$ decreases again to the value $V_Z$ during the succeeding flyback portion 3 of the voltage $V_1$.

The collector-emitter path of the transistor $T_1$ is connected to a source of positive voltage through a collector resistance 15. Such path is rendered conductive only during the occurrence of the pulse portion of the voltage $V_3$ indicated in FIG. 2c.

The corresponding output pulse appearing at the collector of the transistor $T_1$ is differentiated by a series R-C circuit consisting of a capacitor 16 and a resistor 17, to yield a sharp impulse $V_4$ corresponding to the leading edge of the pulse voltage $V_3$. The impulse $V_4$ is applied to the base of a driver transistor $T_2$, whose collector-emitter path interconnects the above-mentioned source of positive voltage with the control electrode 56 of the thyristor 54 for purposes of varying the phase of its excitation as indicated above. From a comparison of FIGS. 2b and 2d, it is seen that each pulse $V_4$ is delayed with respect to the start of the associated forward sweep portion 2 of the deflection transformer voltage by an amount proportional to the magnitude of the effective DC voltage $V_A$ and thereby to the amplitude of the forward sweep portion 2. Such variable delay represents the required phase shift of the excitation pulse applied to the thyristor 54 when the transistor $T_2$ is driven into conduction upon the occurrence of the pulse $V_4$.

The operation of the arrangement 60 in connection with the conventional components 50–52 and 54 is evident from a comparison of columns A, B and C of FIGS. 2a–2d. In particular, when the tube 52 loads the transformer 51 by a predetermined "normal" amount, the sweep voltage $V_1$ exhibits the amplitude shown in column B of FIG. 2a. The corresponding time of occurrence of the thyristor control pulse $V_4$ with respect to a sync pulse 70 derived, e.g., at the start of the flyback interval 3 or the forward sweep interval 2, is $T_2$. As a result the thyristor 54 conducts from such time $T_2$ to the end of the corresponding forward sweep portion 2, which is assumed to adjust the excitation input 53 of the circuit 50 sufficient to maintain, at the output of the transformer 51, the value of the voltage $V_1$ indicated in FIG. 2a, column B.

Figure 2D:
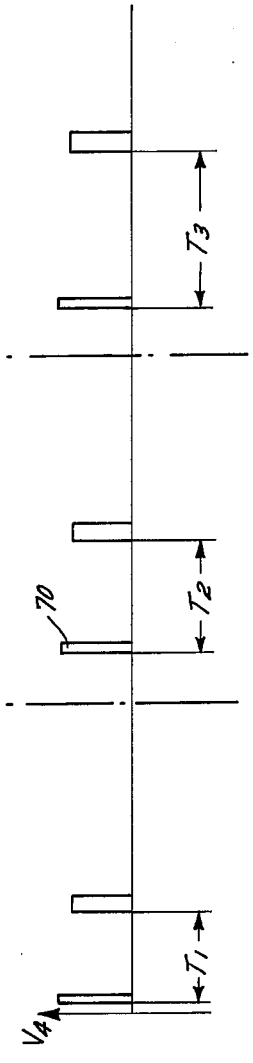
FIG. 2d is a set of curves illustrating pulse waveforms derived from the pulses of FIG. 2c under the respective load conditions indicated above.

If the beam current of the tube 52 decreases, leading to an increase in the voltage $V_1$ as shown in column A, the positive-slope portion of the sawtooth voltage $V_2$ will coincide with the preset zener diode voltage $V_Z$ earlier in the forward sweep portion than $T_2$, illustratively $T_1$ as indicated in FIG. 2d. As a result, the thyristor 54 will conduct for a longer duration during the forward sweep interval, thereby additionally loading the input 53 of the circuit 50 and decreasing the voltage $V_1$ toward the nominal value shown in column B.

In like manner, if the beam current of the tube 52 increases from the nominal value, the voltage $V_1$ will decrease from the nominal value as shown in FIG. 2a, column C. As a result, the voltage $V_2$ will coincide with the preset zener diode voltage $V_Z$ at a later point in the forward sweep, whereby the impulse $V_4$ will be generated at a later time $T_3$ in the forward sweep portion relative to the pulse 70, whereby the thyristor 54 will conduct for a shorter time during the forward sweep; and the resultant decrease in loading of the circuit 50 will cause the transformer voltage $V_1$ to increase toward the nominal value shown in column B.

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In an apparatus for varying the excitation of a sweep deflection circuit, the deflection circuit including a transformer exhibiting a repetitive voltage occurring at a first rate and having a first forward sweep portion and a second flyback portion, the apparatus including a thyratron-like switching element associated with the deflection circuit and responsive to a variable-phase trigger control pulse applied to a control electrode of such switching element for varying the excitation of the deflection circuit in proportion to changes in the phase of the control pulse, an improved arrangement for varying the triggering instant of the switching element which comprises, in combination, means coupled to the transformer and responsive to the first voltage portion for generating, at the first rate, a saw-tooth voltage having a constant difference between its maximum and minimum voltage values and further having an effective variable DC component instantaneously proportional to the amplitude of the then-occurring first voltage portion, means coupled to the sawtooth voltage generating means for generating a constant-amplitude control pulse at the instant when the sawtooth voltage exceeds a predetermined amplitude, and means for applying the control pulse to the control electrode of the switching element.

2. Apparatus as defined in claim 1, in which the sawtooth voltage generating means comprises, in combination, a first capacitor, means including a first charging diode for coupling the transformer voltage to the first capacitor, the first diode and the first capacitor defining a first series path, the first diode being poled to present a relatively low impedance to the first voltage portion, a second diode connected across the first series path in phase opposition to the first diode, and a discharge resistor coupled across the first diode in series with the second diode, the sawtooth voltage appearing across the first capacitor.

3. Apparatus as defined in claim 2, in which the control pulse generating means comprises, in combination, a variable voltage divider having input terminals coupled across the first capacitor, and means including a zener diode coupled across the output terminals of the voltage divider, the control pulse appearing at the output of the zener diode.

4. Apparatus as defined in claim 3, in which the control pulse applying means comprises, in combination, a normally disabled transistor, means including the emitter-collector path of the transistor for exciting the control electrode of the switching element when the transistor is conductive, and means for coupling the zener diode to the base of the transistor for switching the transistor into conduction in response to the control pulse.

5. Apparatus as defined in claim 4, in which the switching means comprises a differentiating circuit interconnecting the output of the zener diode and the base of the transistor.

* * * * *